(12) United States Patent
Katsumata et al.

(10) Patent No.: US 12,103,244 B2
(45) Date of Patent: Oct. 1, 2024

(54) JOINT STRUCTURE AND METHOD FOR MANUFACTURING JOINT STRUCTURE

(71) Applicant: MITSUBISHI HEAVY INDUSTRIES, LTD., Tokyo (JP)

(72) Inventors: Tsukasa Katsumata, Tokyo (JP); Kiyoka Takagi, Tokyo (JP); Naoaki Fujiwara, Tokyo (JP); Sota Kamo, Tokyo (JP); Kosuke Oka, Tokyo (JP); Kazuki Ohashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 183 days.

(21) Appl. No.: 17/791,014

(22) PCT Filed: Dec. 17, 2020

(86) PCT No.: PCT/JP2020/047097
§ 371 (c)(1),
(2) Date: Jul. 6, 2022

(87) PCT Pub. No.: WO2021/140861
PCT Pub. Date: Jul. 15, 2021

(65) Prior Publication Data
US 2023/0016964 A1 Jan. 19, 2023

(30) Foreign Application Priority Data

Jan. 10, 2020 (JP) ................................. 2020-003164

(51) Int. Cl.
*B29C 65/48* (2006.01)
*B29C 65/00* (2006.01)
(Continued)

(52) U.S. Cl.
CPC ............ *B29C 65/48* (2013.01); *B29C 66/721* (2013.01); *B29C 70/30* (2013.01);
(Continued)

(58) Field of Classification Search
CPC ....... B29C 65/48; B29C 66/721; B29C 70/30; B29L 2031/3085; B64C 3/26; B64C 2001/0072
See application file for complete search history.

(56) References Cited

U.S. PATENT DOCUMENTS

2010/0086804 A1 4/2010 Popp et al.
2012/0121854 A1* 5/2012 Yoshida ................. B64C 1/068
428/137
(Continued)

FOREIGN PATENT DOCUMENTS

EP 2 487 106 8/2016
JP 2010-524767 7/2010
(Continued)

OTHER PUBLICATIONS

Extended European Search Report issued Dec. 5, 2022 in corresponding European Patent Application No. 20911838.9.
(Continued)

*Primary Examiner* — Michael Zhang
(74) *Attorney, Agent, or Firm* — Wenderoth, Lind & Ponack, L.L.P.

(57) ABSTRACT

A joint structure includes a reinforcement portion that is formed by joining a composite material and a reinforcing material through an adhesive. The composite material includes a plate portion that is formed by laminating a plurality of fiber sheets, and a raised portion that is formed by laminating a plurality of fiber sheets in addition to the
(Continued)

plurality of fiber sheets of the plate portion, and surfaces of the plate portion and the raised portion are covered with a single fiber sheet. The reinforcement portion includes the raised portion and the reinforcing material that is bonded to the raised portion through an adhesive. A first boundary between the plate portion and the raised portion and a second boundary between the raised portion and the reinforcing material are located at different positions in an in-plane direction of a laminated interface between the fiber sheets that are laminated.

7 Claims, 5 Drawing Sheets

(51) Int. Cl.
    *B29C 70/30*     (2006.01)
    *B29L 31/30*     (2006.01)
    *B64C 1/00*     (2006.01)
    *B64C 3/26*     (2006.01)

(52) U.S. Cl.
    CPC ......... *B29L 2031/3085* (2013.01); *B64C 1/00* (2013.01); *B64C 3/26* (2013.01)

(56) References Cited

U.S. PATENT DOCUMENTS

| | | | |
|---|---|---|---|
| 2017/0072656 A1* | 3/2017 | Dodworth | B29C 70/345 |
| 2018/0050788 A1 | 2/2018 | Kismarton et al. | |
| 2019/0193371 A1 | 6/2019 | Shinozaki et al. | |
| 2019/0270508 A1 | 9/2019 | Cass et al. | |
| 2021/0086886 A1* | 3/2021 | Behzadpour | B64C 3/26 |

FOREIGN PATENT DOCUMENTS

| | | |
|---|---|---|
| JP | 2018-65553 | 4/2018 |
| JP | 2019-111807 | 7/2019 |
| JP | 2019-151321 | 9/2019 |
| WO | 2011/043346 | 4/2011 |

OTHER PUBLICATIONS

International Search Report issued Mar. 9, 2021 in corresponding International (PCT) Patent Application No. PCT/JP2020/047097, with English language translation.
Written Opinion issued Mar. 9, 2021 in corresponding International (PCT) Patent Application No. PCT/JP2020/047097, with English language translation.

* cited by examiner

JOINT STRUCTURE AND METHOD FOR MANUFACTURING JOINT STRUCTURE

TECHNICAL FIELD

The present disclosure relates to a joint structure having a reinforcement portion, and a method for manufacturing the joint structure.

BACKGROUND ART

In the related art, as a joint structure having a reinforcement portion, an aircraft wing in which a stringer is attached to a skin is known (refer to, for example, PTL 1). The skin is formed in a flat plate shape, and the stringer is joined to protrude from the surface of the flat plate-shaped skin.

CITATION LIST

Patent Literature

[PTL 1] Japanese Unexamined Patent Application Publication No. 2018-65553

SUMMARY OF INVENTION

Technical Problem

However, a load is applied to the joint structure as shown in PTL 1. Due to this load, a stress is concentrated on a boundary portion between the skin and the stringer, in which a shape changes. In this way, a large stress (peel stress) is applied in the direction in which the skin and the stringer are peeled off. Therefore, the boundary portion between the skin and the stringer needs to have a structure capable of withstanding a large peel stress, which causes an increase in weight at the boundary portion.

Therefore, the present disclosure has an object to provide a joint structure and a method for manufacturing the joint structure, in which it is possible to improve joint strength.

Solution to Problem

A joint structure of the present disclosure includes a reinforcement portion that is formed by joining a composite material and a reinforcing material through an adhesive, in which the composite material includes a plate portion that is formed by laminating a plurality of fiber sheets, and a raised portion that is formed by further laminating the fiber sheets with respect to the plate portion, surfaces of the plate portion and the raised portion are covered with a single fiber sheet, the reinforcement portion includes the raised portion and the reinforcing material that is bonded to the raised portion through an adhesive, and a first boundary between the plate portion and the raised portion and a second boundary between the raised portion and the reinforcing material are located at different positions in an in-plane direction of a laminated interface between the fiber sheets that are laminated.

A method for manufacturing a joint structure of the present disclosure includes: a step of molding a composite material which includes a plate portion that is formed by laminating a plurality of fiber sheets, and a raised portion that is formed by further laminating the fiber sheets with respect to the plate portion, and in which surfaces of the plate portion and the raised portion are covered with a single fiber sheet; a step of molding a reinforcing material to be joined to the raised portion of the composite material; and a step of forming a joint structure by joining the raised portion of the composite material and the reinforcing material through an adhesive.

Advantageous Effects of Invention

According to the present disclosure, it is possible to improve joint strength in a reinforcement portion.

DESCRIPTION OF EMBODIMENTS

Hereinafter, embodiments according to the present invention will be described in detail based on the drawings. The present invention is not limited by the embodiments. Further, the constituent elements in the following embodiments include those that can be easily replaced by those skilled in the art, or those that are substantially the same as the constituent elements.

Further, the constituent elements described below can be appropriately combined, and in a case where there are a plurality of embodiments, each embodiment can be combined.

Embodiment 1

A joint structure 1 according to Embodiment 1 is, for example, a joint structure made by joining aircraft components by using an adhesive. Further, the joint structure 1 is made by joining composite materials, and as the composite material, a laminate made by laminating and curing fiber sheets S is used.

Figure 1:
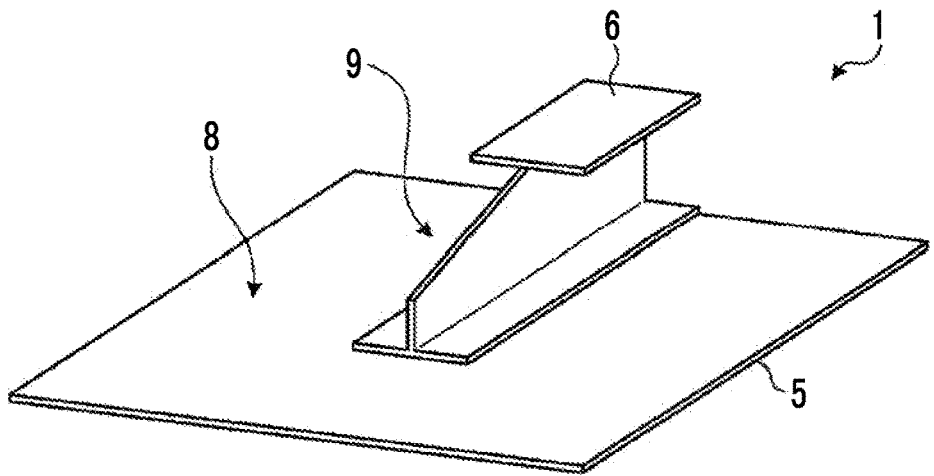
FIG. 1 is a perspective view schematically showing a joint structure according to Embodiment 1.
Figure 2:
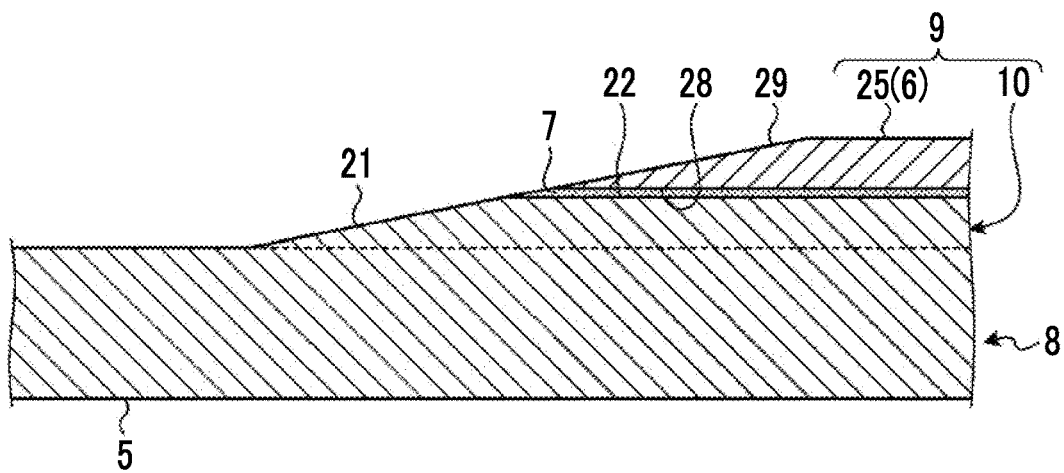
FIG. 2 is a sectional view schematically showing the joint structure according to Embodiment 1.
Figure 3:
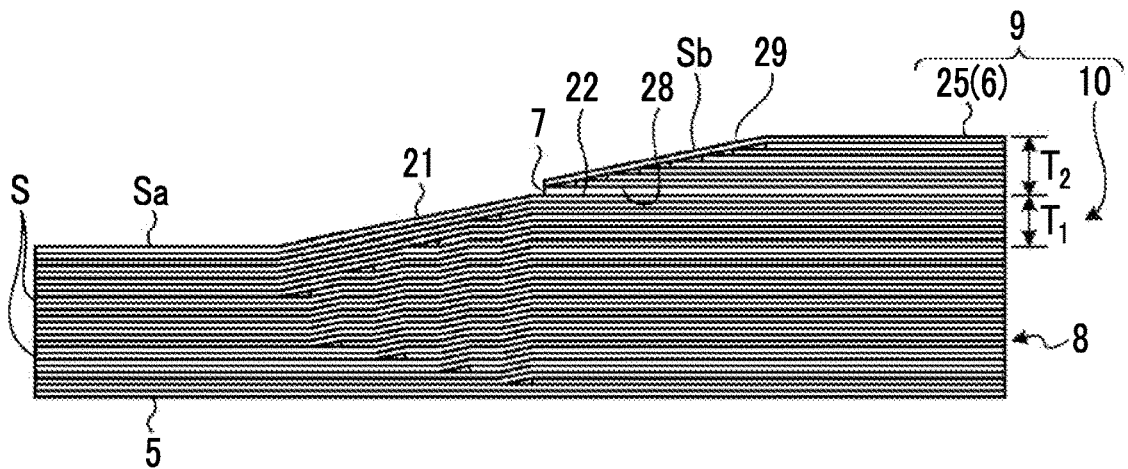
FIG. 3 is a sectional view showing a laminated structure of the joint structure according to Embodiment 1.

FIG. 1 is a perspective view schematically showing the joint structure according to Embodiment 1. FIG. 2 is a sectional view schematically showing the joint structure according to Embodiment 1. FIG. 3 is a sectional view showing a laminated structure of the joint structure according to Embodiment 1.

(Joint Structure)

As shown in FIG. 1, the joint structure 1 includes, for example, a skin 5 and a stringer 6 as a reinforcing material, and is a structure made by joining the skin 5 and the stringer 6. That is, the joint structure 1 includes the skin 5 reinforced by the stringer 6. The joint structure 1 is not particularly limited to the structure made by joining the skin 5 and the stringer 6. The joint structure 1 may have any configuration as long as it is a composite material in which composite materials are joined to each other, and which is reinforced. Further, in the joint structure 1, a material that is used for the reinforcing material such as the stringer 6 may be a composite material or a metallic material, and is not particularly limited.

The skin 5 is a laminate in which a plurality of fiber sheets S are laminated. The skin 5 is, for example, a composite material in which a plurality of prepregs as the fiber sheets S are laminated and thermally cured. As shown in FIGS. 2 and 3, the skin 5 has a plate portion 8 and a pad-up portion (a raised portion) 10. In the skin 5, the plate portion 8 and the pad-up portion 10 are integrally molded by laminating a plurality of fiber sheets S.

The plate portion 8 is a portion serving as a main body of the skin 5. A surface on one side (a surface on the lower side in FIG. 1) of the plate portion 8 serves as an outer surface, and a surface on the other side (a surface on the upper side in FIG. 1) serves as an inner surface. The plate portion 8 shown in FIG. 1 has, for example, a flat plate shape. The plate portion 8 may be a flat plate having no contour (not curved) or a flat plate having a contour (curved).

The pad-up portion 10 is a portion formed to be raised with respect to the inner surface of the plate portion 8. The pad-up portion 10 is a portion that configures a part of a reinforcement portion 9 of the joint structure 1. Further, the pad-up portion 10 is a portion to which the stringer 6 is bonded, and is provided on the entire surface of a surface to be bonded, to which the stringer 6 is bonded. The pad-up portion 10 has, for example, a trapezoidal cross section in which the height increases from an edge portion (one side in an in-plane direction) toward a central portion and the central portion is flat. Specifically, as shown in FIGS. 2 and 3, the pad-up portion 10 has a first inclined surface 21 formed on the edge portion and a flat surface 22 connected to the first inclined surface 21. Here, the boundary between the plate portion 8 and the pad-up portion 10 is set as a first boundary, and the boundary between the pad-up portion 10 and the stringer 6 that is joined to the pad-up portion 10 is set as a second boundary. The first inclined surface 21 is an inclined surface that is an ascending slope in which the plate thickness increases from the first boundary toward the second boundary. The flat surface 22 is a surface extending in the in-plane direction parallel to the laminated interface between the fiber sheets S from the second boundary.

The laminated structure of the skin 5 will be described with reference to FIG. 3. Here, the direction parallel to the laminated interface is set as the in-plane direction, and the direction orthogonal to the laminated interface is set as a plate thickness direction. In the skin 5, since the plate portion 8 has a constant plate thickness in the plate thickness direction, the number of laminated fiber sheets in the plate portion 8 is constant. On the other hand, in the skin 5, since the pad-up portion 10 and the plate portion 8 are integrated, the plate thickness of the skin 5 in the plate thickness direction increases from the first boundary toward the second boundary, and therefore, the number of laminated fiber sheets S in the pad-up portion 10 increases from the first boundary toward the second boundary. At this time, the inner surfaces of the plate portion 8 and the pad-up portion 10 are covered with a single fiber sheet Sa. That is, since the inner surface of the skin 5 is covered with the fiber sheet Sa, the skin 5 has a laminated structure in which the end portions of the fiber sheets S in an inner layer are not exposed.

Similar to the skin 5, the stringer 6 is a laminate in which a plurality of fiber sheets S are laminated. The stringer 6 is a member that configures a part of the reinforcement portion 9 of the joint structure 1. The stringer 6 is, for example, a composite material in which a plurality of prepregs as the fiber sheets S are laminated and thermally cured. As shown in FIG. 1, the stringer 6 has, for example, two flange portions and a web portion provided between the two flange portions, and is formed to have an H-shaped cross section by the two flange portions and the web portion. As shown in FIGS. 2 and 3, in the stringer 6, a flange portion 25 on one side out of the two flange portions is joined to the pad-up portion 10. The stringer 6 is not particularly limited to the H-shaped cross section, and may have a C-shaped cross section, a T-shaped cross section, an L-shaped cross section, or a J-shaped cross section.

The flange portion 25 on one side has a bottom surface 28 facing the flat surface 22 of the pad-up portion 10, and a second inclined surface 29 which is an ascending slope from the second boundary. The second inclined surface 29 is an inclined surface that is an ascending slope in which the plate thickness increases from the second boundary, which is an edge portion, toward the central portion. The bottom surface 28 is a surface extending in the in-plane direction parallel to the laminated interface between the fiber sheets S from the second boundary.

The laminated structure in the flange portion 25 on one side of the stringer 6 will be described with reference to FIG. 3. Since the plate thickness of the flange portion 25 in the plate thickness direction increases from the second boundary toward the central portion, the number of laminated fiber sheets S in the flange portion 25 increases from the second boundary toward the central portion. At this time, similarly to the skin 5, in the flange portion 25, the second inclined surface 29 is covered with a single fiber sheet Sb. That is, since the second inclined surface 29 of the flange portion 25 is covered with the fiber sheet Sb, the laminated structure in which the end portions of the fiber sheets S in the inner layer are not exposed is obtained.

The flat surface 22 of the pad-up portion 10 of the skin 5 and the bottom surface 28 of the flange portion 25 of the stringer 6 are surfaces to be bonded, which are bonded to each other by an adhesive. The skin 5 and the stringer 6 form the joint structure 1 by bonding the flat surface 22 of the pad-up portion 10 and the bottom surface 28 of the flange portion 25 through an adhesive 7. Further, the first inclined surface 21 and the second inclined surface 29 have the same inclination angle in an out-of-plane direction intersecting the in-plane direction, and form a surface which is continuous without a step. The first inclined surface 21 and the second inclined surface 29 may have different inclination angles, and are not particularly limited to the same inclination angle.

In the joint structure 1 as described above, the pad-up portion 10 and the stringer 6 joined together function as the reinforcement portion 9. Then, in the joint structure 1, the first boundary between the plate portion 8 and the reinforcement portion 9 (the pad-up portion 10 thereof) and the second boundary between the pad-up portion 10 and the flange portion 25 of the stringer 6 are located at different positions in the in-plane direction.

(Method for Manufacturing Joint Structure)

Figure 4:
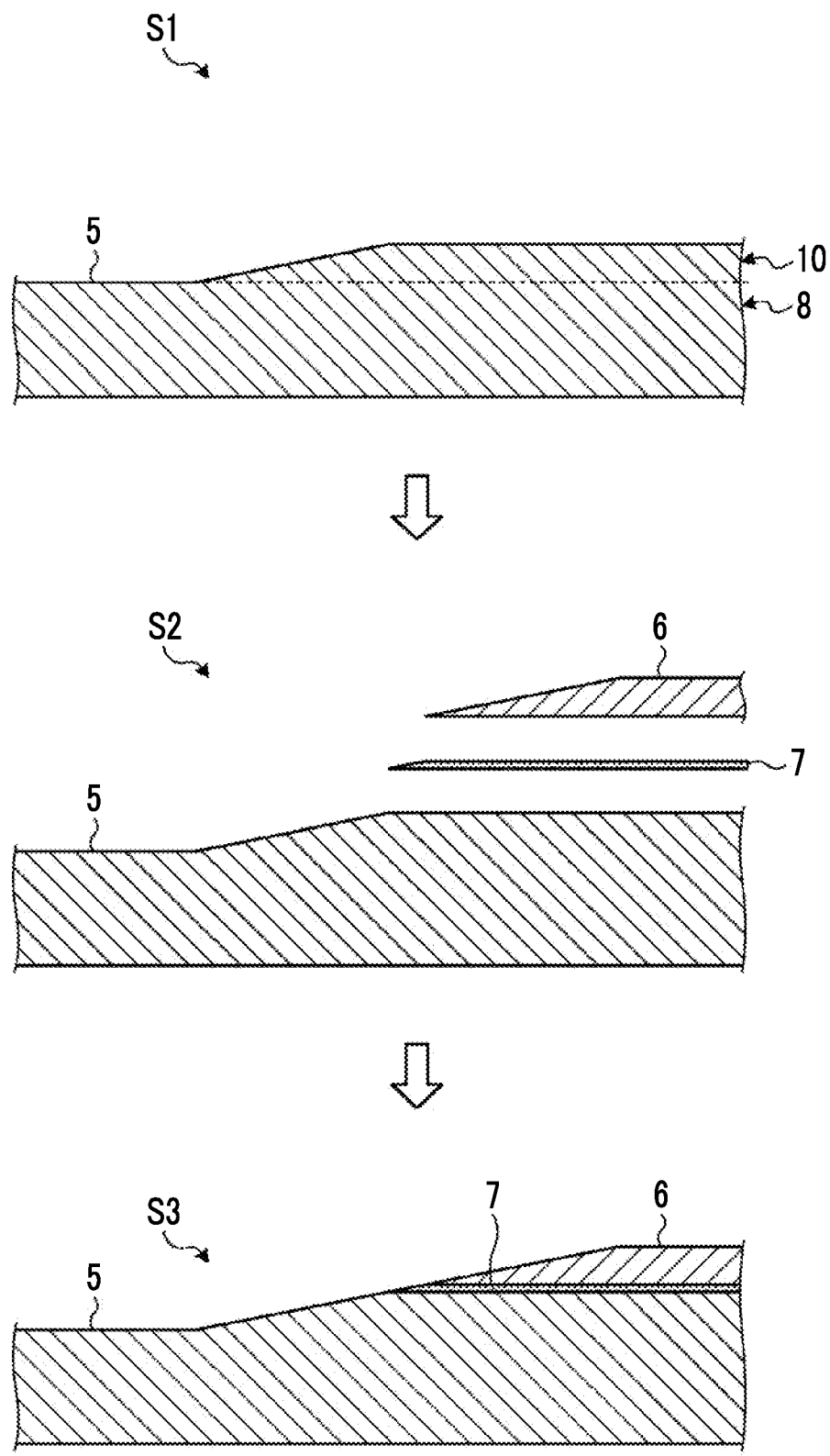
FIG. 4 is a flowchart relating to a method for manufacturing a joint structure according to Embodiment 1.

Next, a method for manufacturing the joint structure 1 will be described with reference to FIG. 4. FIG. 4 is a flowchart relating to the method for manufacturing a joint structure according to Embodiment 1. In the method for manufacturing the joint structure 1, the skin 5 in which the plate portion 8 and the pad-up portion 10 are integrated is molded, and the molded skin 5 is disposed (step S1). Subsequently, the stringer 6 to be joined to the pad-up portion 10 is molded, and the molded stringer 6 is disposed (step S2). Then, the adhesive 7 such as an adhesive sheet is disposed between the pad-up portion 10 of the skin 5 and the stringer 6 (step S2), and the adhesive 7 is cured, so that the joint structure 1 in which the skin 5 and the stringer 6 are joined together is formed (step S3).

(Comparison Between Joint Structure of Related Art and Joint Structure of Embodiment 1)

Figure 5:
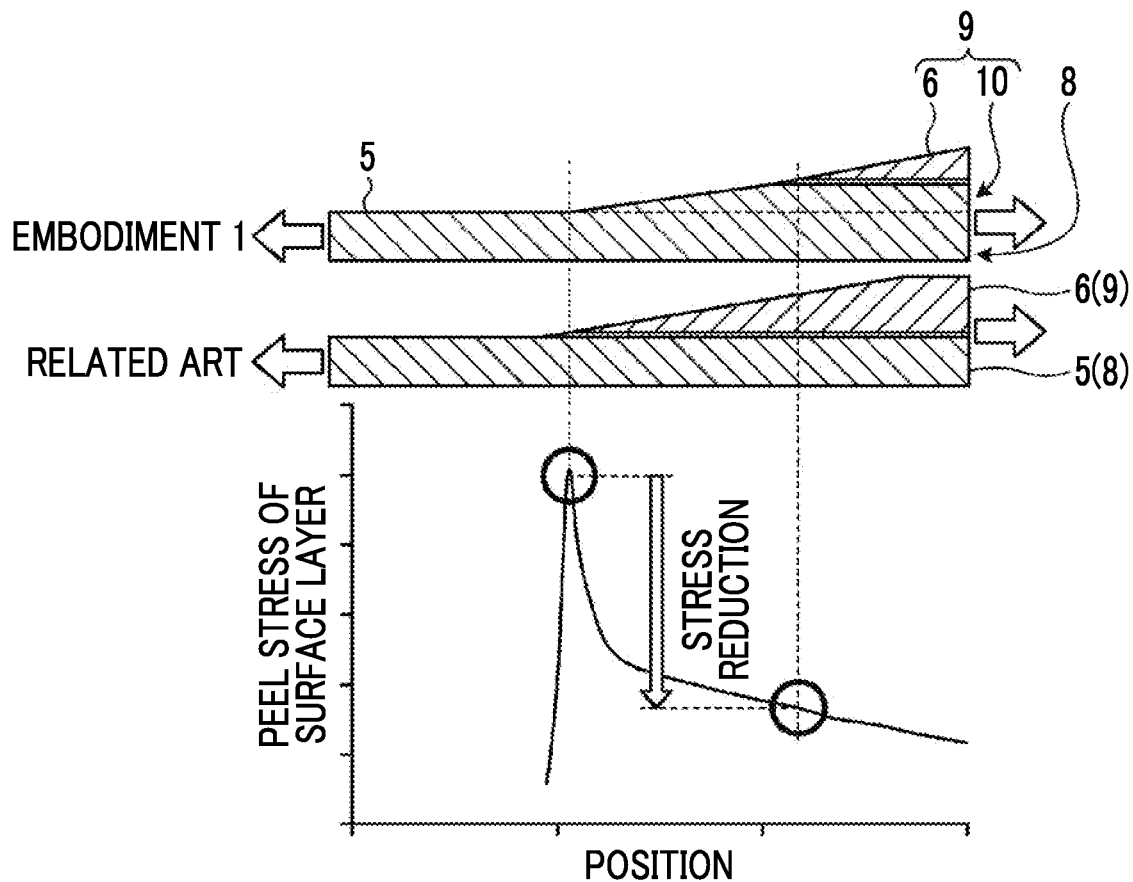
FIG. 5 is a diagram comparing peel stress between a joint structure of the related art and the joint structure of Embodiment 1.

Next, the peel stress that is applied to the joint structure of the related art and the peel stress that is applied to the joint structure 1 of Embodiment 1 will be compared with reference to FIG. 5. FIG. 5 is a diagram comparing the peel stress between the joint structure of the related art and the joint structure of Embodiment 1. In FIG. 5, the horizontal axis thereof represents a position in the in-plane direction, and the vertical axis thereof represents the peel stress that is applied to the surface layer (the outermost layer of the inner surface).

The joint structure of the related art includes the skin 5 and the stringer 6 and has a configuration in which the skin 5 corresponds to the plate portion 8 of Embodiment 1 and the stringer 6 corresponds to the reinforcement portion 9 of Embodiment 1. That is, in the joint structure of the related art, the stringer 6 which is a separate body corresponding to the reinforcement portion 9 is joined to the skin 5. In contrast, in the joint structure 1 of Embodiment 1, the stringer 6 configuring a part of the reinforcement portion 9 is joined to the skin 5 having the pad-up portion 10 configuring a part of the reinforcement portion 9.

In the joint structure of the related art, the first boundary, which is the boundary between the skin 5 (the plate portion 8) and the reinforcement portion 9, and the second boundary, which is the boundary between the skin 5 and the stringer 6, are located at the same position in the in-plane direction. In contrast, in the joint structure 1 of Embodiment 1, the first boundary between the plate portion 8 and the reinforcement portion 9 (the pad-up portion 10 thereof) and the second boundary between the pad-up portion 10 and the flange portion 25 of the stringer 6 are located at different positions in the in-plane direction.

As shown in FIG. 5, in the joint structure 1, the peel stress is concentrated on the first boundary between the skin 5 (the plate portion 8) and the reinforcement portion 9. The peel stress is a tensile stress in the out-of-plane direction. Therefore, in the joint structure of the related art, since the first boundary and the second boundary are located at the same position, a large peel stress is applied to the adhesive interface between the skin 5 and the stringer 6. On the other hand, in the joint structure 1 of Embodiment 1, since the first boundary and the second boundary are located at different positions, the peel stress that is applied to the adhesive interface between the skin 5 and the stringer 6 can be reduced compared to that in the related art.

Figure 6:
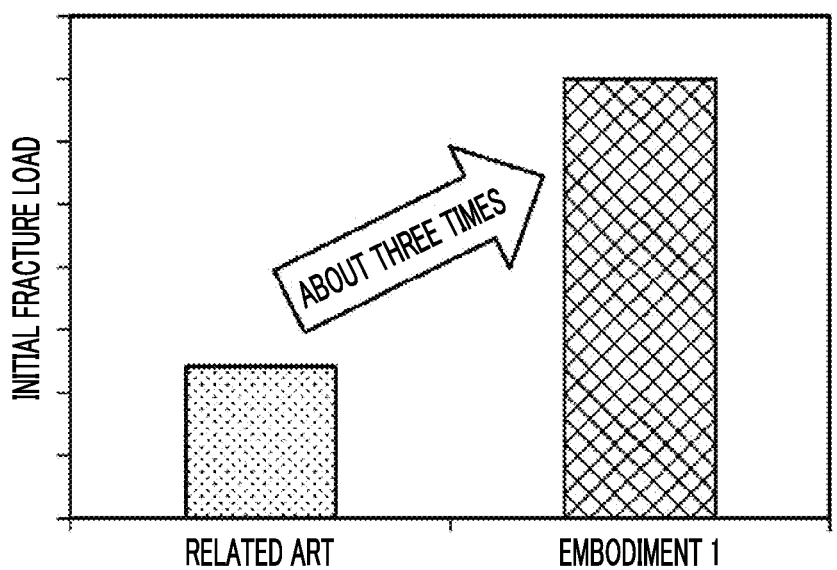
FIG. 6 is a diagram showing the joint strength performance in the joint structure of the related art and the joint structure of Embodiment 1.

FIG. 6 is a diagram showing the joint strength performance in the joint structure of the related art and the joint structure of Embodiment 1. The vertical axis of FIG. 6 represents an initial fracture load in the joint structure 1 of the related art and the joint structure of Embodiment 1. If the peel stress at the adhesive interface is high, a fracture easily occurs in the adhesive interface, so that the joint strength is reduced and the initial fracture load of the joint structure 1 becomes a small value. That is, the larger the initial fracture load, the higher the joint strength performance becomes. As shown in FIG. 6, the joint structure 1 of Embodiment 1 has an initial fracture load of about three times that of the joint structure of the related art, and improvement in the joint strength performance is confirmed.

(Plate Thickness of Pad-Up Portion of Joint Structure)

Figure 7:
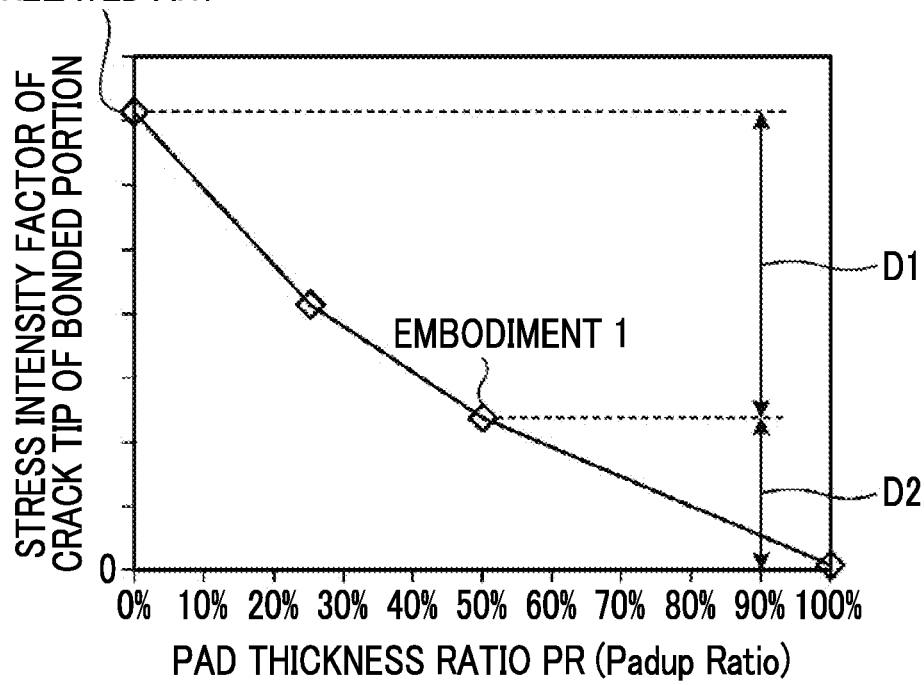
FIG. 7 is a graph showing the relationship between the thickness of a pad-up portion and the ease of peeling-off.

Next, the plate thickness of the pad-up portion 10 in the joint structure 1 of Embodiment 1 will be described with reference to FIG. 7. FIG. 7 is a graph showing the relationship between the plate thickness of the pad-up portion and the ease of peeling-off. As shown in FIG. 3, the plate thickness of the pad-up portion 10 is set to be $T_1$, and the plate thickness of the flange portion 25 is set to be $T_2$. In this case, the total plate thickness at the bonded portion is plate thickness $T_1$+plate thickness $T_2$, and a pad thickness ratio PR, which is the ratio of the plate thickness of the pad-up portion 10 to the total plate thickness, is $PR=T_1/(T_1+T_2)$. In FIG. 7, the vertical axis thereof represents a stress intensity factor of a crack tip of the bonded portion, which is a parameter relating to the ease of peeling-off. The larger the stress intensity factor, the easier the peeling-off becomes because the cracks easily grow, and the smaller the stress intensity factor, the harder the peeling-off becomes because the cracks do not easily grow. Further, in FIG. 7, the horizontal axis thereof represents the pad thickness ratio PR.

As shown in FIG. 7, the larger the ratio of the plate thickness of the pad-up portion 10 becomes, the smaller the stress intensity factor becomes. On the other hand, a change in stress intensity factor due to a change in the ratio of the plate thickness of the pad-up portion 10, that is, the sensitivity of the stress intensity factor is large in a case where the ratio of the plate thickness of the pad-up portion 10 is small, and is small in a case where the ratio of the plate thickness of the pad-up portion 10 is large. Specifically, in Embodiment 1, the pad thickness ratio PR is 50%, and when the pad thickness ratio PR (=50%) is set as a boundary, a change D1 in stress intensity factor in the range of the pad thickness ratio PR from 0% to 50% is larger compared to a change D2 in stress intensity factor in the range of the pad thickness ratio PR from 50% to 100%. From the above, it is confirmed that by making the plate thickness of the pad-up portion 10 equal to or smaller than the plate thickness of the flange portion 25, it is possible to efficiently make a configuration in which the peeling-off is difficult due to a small change in the plate thickness of the pad-up portion 10.

As described above, according to Embodiment 1, since the first boundary and the second boundary can be located at different positions in the in-plane direction, the peel stress that is applied to the adhesive interface between the skin 5 and the stringer 6 can be reduced, whereby it is possible to improve the joint strength between the skin 5 and the stringer 6.

Further, according to Embodiment 1, since the pad-up portion 10 is provided on the entire surface of the surface to be bonded, to which the stringer 6 is bonded, the flat surface of the pad-up portion 10, which serves as the surface to be bonded, and the bottom surface 28 of the flange portion 25 can be made to have a simple shape.

Further, according to Embodiment 1, since the first inclined surface 21 and the second inclined surface 29 can form a continuous surface without a step, a change in shape at the second boundary can be suppressed, so that the concentration of the peel stress can be relaxed.

Further, according to Embodiment 1, by making the plate thickness $T_1$ of the pad-up portion 10 equal to or smaller than the plate thickness $T_2$ of the flange portion 25, it is possible to efficiently make a configuration in which the peeling-off is difficult due to a small change in the plate thickness of the pad-up portion 10.

Further, according to Embodiment 1, the joint structure 1 having a high joint strength between the skin 5 and the stringer 6 can be easily manufactured.

Embodiment 2

Figure 8:
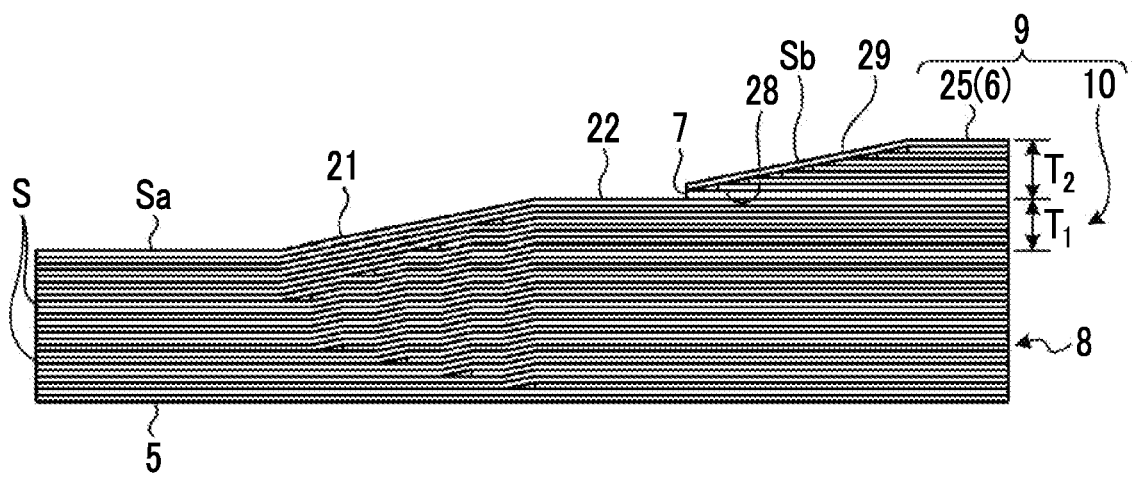
FIG. 8 is a sectional view showing a laminated structure of a joint structure according to Embodiment 2.

Next, the joint structure 1 according to Embodiment 2 will be described with reference to FIG. 8. In Embodiment 2, portions different from those in Embodiment 1 will be described in order to avoid overlapping description, and portions having the same configurations as those in Embodiment 1 will be described with the same reference numerals. FIG. 8 is a sectional view showing a laminated structure of the joint structure according to Embodiment 2.

In the joint structure 1 of Embodiment 2, the flange portion 25 of the joint structure 1 of Embodiment 1 is bonded such that a part of the flat surface 22 of the pad-up portion 10 is exposed. Specifically, the flange portion 25 is bonded to the pad-up portion 10 with being offset so as to be separated from the intersection portion of the first inclined surface 21 of the pad-up portion 10 and the flat surface 22 in the in-plane direction. Therefore, the pad-up portion 10 and the flange portion 25 form a stepped shape in which a step is formed.

As described above, according to Embodiment 2, since the flange portion 25 can be bonded to the flat surface 22 of the pad-up portion 10 in an offset state, it is possible to make the alignment between the pad-up portion 10 and the flange portion 25 easy, and it is possible to improve the efficiency of the bonding work. Further, since the position of the flange portion 25 can be offset with respect to the flat surface 22 of the pad-up portion 10, it becomes possible to absorb (allow) the assembly tolerance of the joint structure 1.

Embodiment 3

Figure 9:
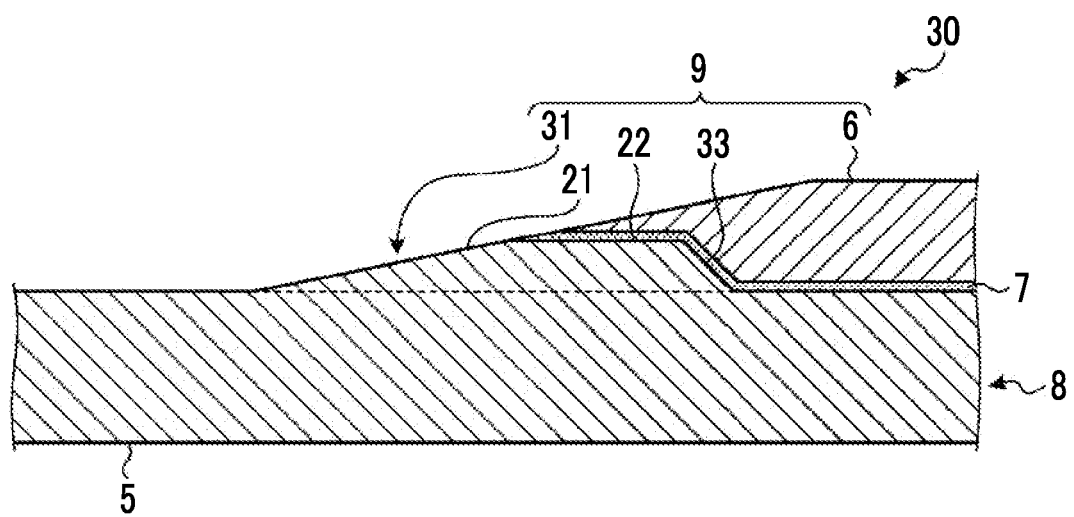
FIG. 9 is a sectional view schematically showing a joint structure according to Embodiment 3.

Next, a joint structure 30 according to Embodiment 3 will be described with reference to FIG. 9. In Embodiment 3, portions different from those in Embodiments 1 and 2 will be described in order to avoid overlapping description, and portions having the same configurations as those in Embodiments 1 and 2 will be described with the same reference numerals. FIG. 9 is a sectional view schematically showing the joint structure according to Embodiment 3.

In the joint structure 30 of Embodiment 3, the pad-up portion 10 of the joint structure 1 of Embodiment 1 is formed at the edge portion of the surface to be bonded, to which the stringer 6 is bonded. Specifically, a pad-up portion 31 of the joint structure 30 is provided only at the portion on the tip side of the flange portion 25 to be bonded. Therefore, the region inside the pad-up portion 31 becomes the plate portion 8 in which the pad-up portion 31 is not integrally provided. The pad-up portion 31 has, for example, a trapezoidal cross section in which the height increases from the edge portion toward the central portion and then becomes flat and the height further decreases. Specifically, as shown in FIG. 9, the pad-up portion 31 has the first inclined surface 21 that is formed on the edge portion (one side in the in-plane direction, that is, the left side in FIG. 9), the flat surface 22 that is connected to the first inclined surface 21, and a third inclined surface 33 that is formed on the other side in the in-plane direction (the right side in FIG. 9) and connected to the flat surface 22. Since the first inclined surface 21 and the flat surface 22 are substantially the same as those in Embodiment 1, the description thereof will be omitted. The third inclined surface 33 is an inclined surface that is a descending slope in which the plate thickness decreases from the flat surface 22 toward the other side in the in-plane direction.

As described above, according to Embodiment 3, by forming the pad-up portion 31 only at the edge portion of the surface to be bonded, it is possible to increase the bonding area, and therefore, the joint strength between the skin 5 and the stringer 6 can be increased. Further, it becomes possible to secure the thickness of the flange portion 25 of the stringer 6 while reducing the peel stress.

The joint structure 1 or 30 and the method for manufacturing the joint structure 1 or 30 described in each embodiment are grasped as follows, for example.

The joint structure 1 or 30 according to a first aspect is the joint structure 1 or 30 including the reinforcement portion 9 which is formed by joining a composite material (the skin 5) and a reinforcing material (the stringer 6) through the adhesive 7, in which the composite material includes the plate portion 8 that is formed by laminating a plurality of fiber sheets S, and a raised portion (the pad-up portion 10) that is formed by further laminating the fiber sheets S with respect to the plate portion 8, the surfaces of the plate portion 8 and the raised portion are covered with the single fiber sheet Sa, the reinforcement portion 9 includes the raised portion and the reinforcing material that is bonded to the raised portion through the adhesive 7, and the first boundary between the plate portion 8 and the raised portion and the second boundary between the raised portion and the reinforcing material are located at different positions in the in-plane direction of the laminated interface between the fiber sheets S that are laminated.

According to this configuration, since the first boundary and the second boundary can be located at different positions in the in-plane direction, the peel stress that is applied to the adhesive interface between the composite material and the reinforcing material can be reduced, whereby it is possible to improve the joint strength between the composite material and the reinforcing material.

As a second aspect, the raised portion is provided on an entire surface of a surface to be bonded where the reinforcing material is bonded to the composite material.

According to this configuration, since the raised portion is provided on the entire surface of the surface to be bonded, to which the reinforcing material is bonded, the surfaces to be bonded of the raised portion and the reinforcing material can be made to have a simple shape.

As a third aspect, the raised portion is provided at an edge portion of a surface to be bonded where the reinforcing material is bonded to the composite material.

According to this configuration, by forming the raised portion only at the edge portion of the surface to be bonded, it is possible to increase the bonding area, and therefore, the joint strength between the composite material and the reinforcing material can be increased.

As a fourth aspect, the raised portion has the first inclined surface 21 that is an ascending slope from the first boundary toward the second boundary, the reinforcing material has the second inclined surface 29 that is an ascending slope from the second boundary, and the raised portion and the reinforcing material are bonded to each other to form a surface in which the first inclined surface 21 and the second inclined surface 29 are connected to each other.

According to this configuration, since the first inclined surface 21 and the second inclined surface 29 can form a continuous surface without a step, a change in shape at the second boundary can be suppressed, and therefore, the concentration of the peel stress can be relaxed.

As a fifth aspect, the raised portion has the first inclined surface 21 that is an ascending slope from the first boundary toward the second boundary, and the flat surface 22 extending in the in-plane direction parallel to the laminated interface between the fiber sheets from the second boundary, and the reinforcing material is bonded to the flat surface 22 with a part of the flat surface 22 of the raised portion exposed.

According to this configuration, since the reinforcing material can be bonded to the raised portion in an offset state, it is possible to make the alignment between the raised portion and the reinforcing material easy, and it is possible to improve the efficiency of the bonding work.

As a sixth aspect, the thickness (plate thickness $T_1$) of the raised portion is equal to or smaller than the thickness (plate thickness $T_2$) of the portion of the reinforcing material, which is bonded to the raised portion.

According to this configuration, by making the thickness of the raised portion equal to or smaller than the thickness of the portion of the reinforcing material, it is possible to efficiently make a configuration in which the peeling-off is difficult due to a small change in the plate thickness of the raised portion.

The method for manufacturing the joint structure 1 or 30 according to a seventh aspect includes: a step of molding a composite material which includes the plate portion 8 that is formed by laminating a plurality of fiber sheets S, and a raised portion that is formed by further laminating the fiber sheets S with respect to the plate portion 8, and in which surfaces of the plate portion 8 and the raised portion are covered with the single fiber sheet Sa; a step of molding a reinforcing material to be joined to the raised portion of the composite material; and a step of forming the joint structure 1 or 30 by joining the raised portion of the composite material and the reinforcing material through the adhesive 7.

According to this configuration, it is possible to easily manufacture the joint structure 1 having a high joint strength between the composite material and the reinforcing material.

REFERENCE SIGNS LIST

1: joint structure
5: skin
6: stringer
7: adhesive
8: plate portion
9: reinforcement portion
10: pad-up portion
21: first inclined surface
22: flat surface
25: flange portion
28: bottom surface
29: second inclined surface
30: joint structure
31: pad-up portion
33: third inclined surface
S, Sa, Sb: fiber sheet

The invention claimed is:

1. A joint structure comprising:
a reinforcement portion formed by joining a composite material and a reinforcing material through an adhesive,
wherein the composite material includes a plate portion formed by laminating a plurality of fiber sheets, and a raised portion formed by laminating a plurality of fiber sheets in addition to the plurality of fiber sheets of the plate portion, and surfaces of the plate portion and the raised portion are covered with a single fiber sheet,
wherein the reinforcement portion includes the raised portion and the reinforcing material bonded to the raised portion through an adhesive,
wherein a first boundary between the plate portion and the raised portion and a second boundary between the raised portion and the reinforcing material are located at different positions in an in-plane direction of a laminated interface between the fiber sheets that are laminated,
wherein the plate portion is a flat plate, and
wherein the raised portion is raised with respect to an inner surface of the plate portion and is provided on an entirety of a surface to which the stringer is bonded, and is configured to reduce a peel stress applied to an adhesive interface between the composite material and the reinforcing material.

2. The joint structure according to claim 1, wherein the raised portion has a surface on which the reinforcing material is bonded to the composite material as a whole.

3. The joint structure according to claim 1, wherein the raised portion is provided at an edge portion of a surface to be bonded where the reinforcing material is bonded to the composite material.

4. The joint structure according to claim 1, wherein the raised portion has a first inclined surface that is an ascending slope from the first boundary toward the second boundary, the reinforcing material has a second inclined surface that is an ascending slope from the second boundary, and the raised portion and the reinforcing material are bonded to each other to form a surface in which the first inclined surface and the second inclined surface are connected to each other.

5. The joint structure according to claim 1, wherein the raised portion has a first inclined surface that is an ascending slope from the first boundary toward the second boundary, and a flat surface extending in an in-plane direction parallel to the laminated interface between the fiber sheets from the second boundary, and
the reinforcing material is bonded to the flat surface with a part of the flat surface of the raised portion exposed.

6. The joint structure according to claim 1, wherein a thickness of the raised portion is equal to or smaller than a thickness of a portion of the reinforcing material, which is bonded to the raised portion.

7. A method for manufacturing a joint structure comprising:
molding a composite material which includes a plate portion that is formed by laminating a plurality of fiber sheets, and a raised portion that is formed by laminating a plurality of fiber sheets in addition to the plurality of fiber sheets of the plate portion, and in which surfaces of the plate portion and the raised portion are covered with a single fiber sheet;
molding a reinforcing material to be joined to the raised portion of the composite material; and
forming a joint structure by joining the raised portion of the composite material and the reinforcing material through an adhesive,
wherein in forming the joint structure, a second boundary between the raised portion and the reinforcing material is set to be located at a different position with respect to a first boundary between the plate portion and the raised portion in an in-plane direction of a laminated interface between the fiber sheets which are laminated,
wherein the plate portion is a flat plate, and
wherein, during the molding of the composite material, the raised portion is raised with respect to an inner surface of the plate portion and is provided on an entirety of a surface to be bonded to which a stringer is bonded, so as to reduce a peel stress applied to an adhesive interface between the composite material and the reinforcing material.

\* \* \* \* \*